June 8, 1937.  R. G. N. EVANS  2,082,944
BEARING LOCK
Filed July 8, 1935
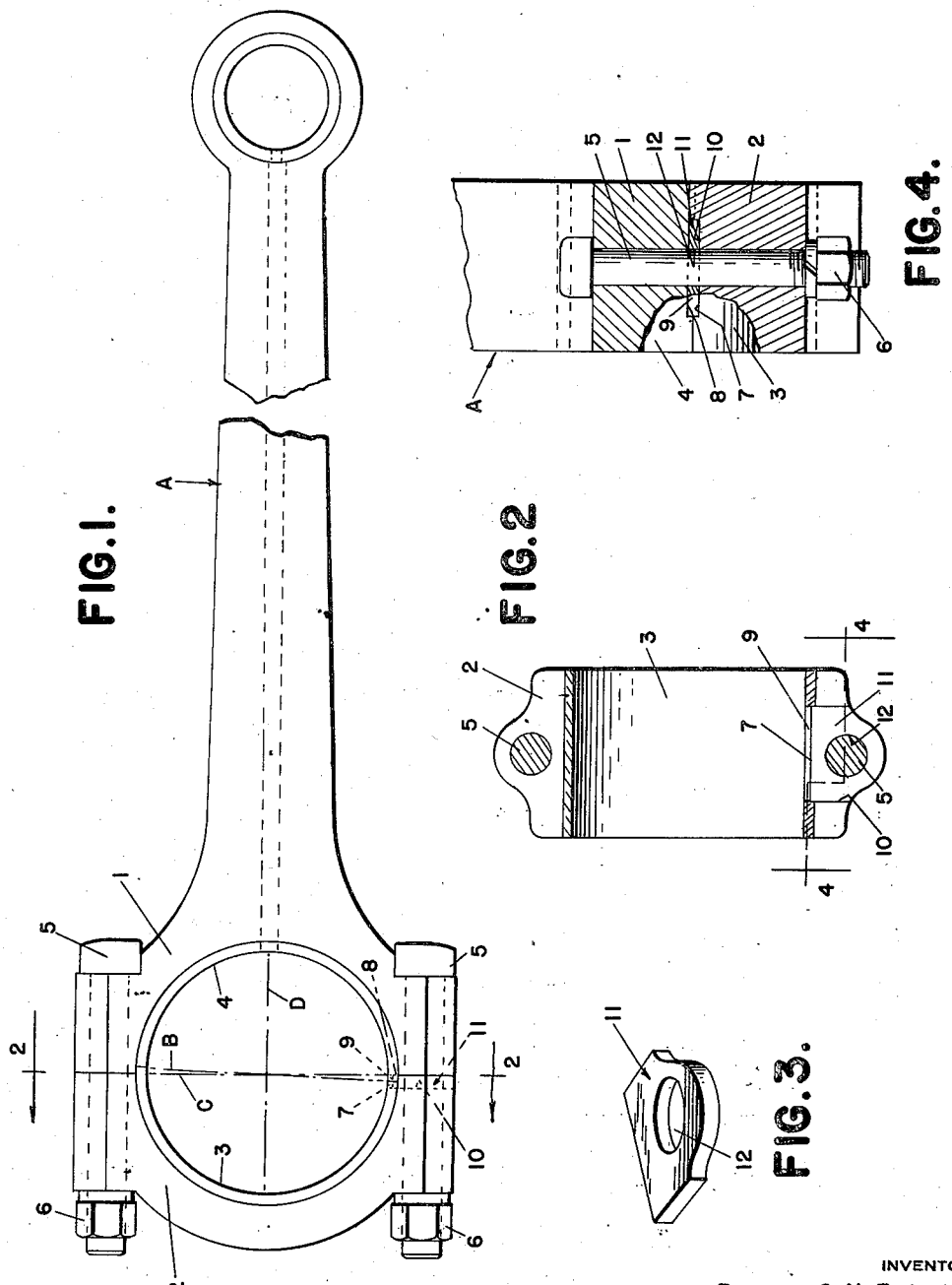
INVENTOR
ROBERT G. N. EVANS
ATTORNEYS Patented June 8, 1937

2,082,944

UNITED STATES PATENT OFFICE 2,082,944

BEARING LOCK

Robert G. N. Evans, Toledo, Ohio, assignor to The Bunting Brass & Bronze Company, Toledo, Ohio, a corporation of Ohio Application July 8, 1935, Serial No. 30,367

3 Claims. (Cl. 308—237)

This invention relates generally to bearings and refers more particularly to an improved means for locking interchangeable bearings within connecting rods or other suitable devices.

One of the essential objects of the invention is to provide a means of the type mentioned that is capable of holding a bearing against both rotary and creeping movements.

Another object is to provide a locking means that is comparatively simple in construction, inexpensive to manufacture, easy to install, and positive in action.

Other objects, advantages and novel details of construction of this invention will be made more apparent as this description proceeds, especially when considered in connection with the accompanying drawing, wherein:

Figure 1 is an elevation of a connecting rod containing a bearing and means embodying my invention for holding the bearing against rotary and creeping movements;

Figure 2 is a sectional view taken substantially on the line 2—2 of Figure 1;

Figure 3 is a detail view of the locking element or key;

Figure 4 is a sectional view taken substantially on the line 4—4 of Figure 2.

Referring now to the drawing, A is a connecting rod provided at one end with cooperating semi-circular portions 1 and 2, respectively, forming a housing for half bearings 3 and 4, respectively. As usual, the portion 1 is integral with the rod A, while the portion 2 comprises a removable cap and is fastened to the portion 1 by bolts 5 and nuts 6.

The half bearings 3 and 4 may be any suitable construction so as to fit snugly within the housing formed by the portions 1 and 2 of the connecting rod. Preferably there is a differential of .008 between the bearings and housing to insure a tight fit. As shown, the ends of the bearings 3 and 4 meet at diametrically opposite points of the housing on a line B which crosses a center line C disposed at right angles to the longitudinal median line D of the connecting rod. At one point, preferably upon the outer side of the line B, the meeting ends of the bearings 3 and 4 have substantially U-shaped slots 7 and 8, respectively, which open toward each other and form a substantially rectangular opening 9 for registration with a radially extending slot 10 in the bearing housing. Preferably this slot 10 is formed in the cap 2 by a milling operation and cooperates with the opening 9 to receive a suitable locking member or key such as 11. As shown, this key 11 fits snugly in the slot 10 and opening 9 and is held in place by one of the bolts 5, a suitable hole 12 being provided in the key 11 for the reception of said bolt. Actually, the key 11 extends only one-half of the way into the opening 9, as will be apparent from an inspection of Figure 2, and effectively holds the half bearings 3 and 4 against rotation and creeping in the housing. Thus, there is no danger of the key 11 contacting the crank shaft or other rotary object (not shown) that is received between the bearings 3 and 4 in the housing. In practice, the key 11 would be one-eighth (⅛) of an inch thick, consequently, the meeting ends of the bearings 3 and 4 on the line B would be approximately one-sixteenth (1/16) of an inch from the center line C. This is especially advantageous and desirable in view of the action to which the bearings 3 and 4 are subjected while in use.

What I claim as my invention is:

1. In combination, a bearing housing having complementary substantially semi-circular sections arranged in opposed relation with their ends abutting each other, cooperating substantially semi-circular half bearings in said housing in opposed relation to each other with their ends abutting in circumferentially spaced relation to the abutting ends of the housing sections, said half bearings being provided at one end thereof beside the joint between the adjacent abutting ends of said housing sections with opposed substantially U-shaped slots forming a substantially rectangular opening, one elongated wall of said opening being in registration with the joint aforesaid between the adjacent abutting ends of said housing sections, one housing section overlapping the joint formed by the abutting ends of said half bearings and having a radially extending substantially rectangular slot extending through one end thereof toward the other section of said housing, the adjacent end of the other housing section being imperforate and cooperating with the walls of said slot to form a substantially rectangular opening substantially in registration with the rectangular opening aforesaid, and means for holding said half bearings against movement in said housing including a single solid key fitting snugly in said registering openings and having an extension in the radially extending slot aforesaid in said housing section beside the adjacent end of the other housing section, and connecting means for said housing sections including a bolt extending through said key extension.

2. In combination, a bearing housing having complementary substantially semi-circular sections arranged in opposed relation with their ends abutting each other, cooperating substantially semi-circular half bearings in said housing in opposed relation to each other with their ends abutting in circumferentially spaced relation to the abutting ends of the housing sections, said half bearings being provided at one end thereof beside the joint between the adjacent abutting ends of said housing sections with opposed substantially U-shaped slots forming a substantially rectangular opening, one housing section overlapping the joint formed by the abutting ends of said half bearings and having a radially extending substantially rectangular slot extending through one end thereof toward the other section of said housing, the adjacent end of the other housing section being imperforate and cooperating with the walls of said slot to form a substantially rectangular opening substantially in registration with the rectangular opening aforesaid, and means for holding said half bearings against movement in said housing including a single solid key fitting snugly in said registering openings.

3. In combination, a bearing housing having complementary substantially semi-circular sections arranged in opposed relation with their ends abutting each other, cooperating substantially semi-circular half bearings in said housing in opposed relation to each other with their ends abutting in circumferentially spaced relation to the abutting ends of the housing sections, said half bearings being provided at one end thereof beside the joint between the adjacent abutting ends of said housing sections with opposed substantially U-shaped slots forming a substantially rectangular opening, one housing section overlapping the joint formed by the abutting ends of said half bearings and having a substantially rectangular opening substantially in registration with the rectangular opening aforesaid, and means fitting snugly in said registering openings for holding said half bearings against movement in said housing.

ROBERT G. N. EVANS.